United States Patent
Li et al.

(10) Patent No.: US 10,708,897 B2
(45) Date of Patent: Jul. 7, 2020

(54) METHODS AND DEVICES FOR DOWNLINK CONTROL CHANNEL TRANSMISSION AND DETECTION IN A WIRELESS COMMUNICATION SYSTEM

(71) Applicant: Telefonaktiebolaget LM Ericsson (publ), Stockholm (SE)

(72) Inventors: Shaohua Li, Beijing (CN); Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/558,258

(22) PCT Filed: Sep. 1, 2017

(86) PCT No.: PCT/CN2017/100266
§ 371 (c)(1),
(2) Date: Sep. 14, 2017

(87) PCT Pub. No.: WO2018/059189
PCT Pub. Date: Apr. 5, 2018

(65) Prior Publication Data
US 2018/0242282 A1      Aug. 23, 2018

(30) Foreign Application Priority Data

Sep. 30, 2016 (WO) ............... PCT/CN2016/101225

(51) Int. Cl.
*H04W 72/04* (2009.01)
*H04W 72/02* (2009.01)
*H04W 72/08* (2009.01)

(52) U.S. Cl.
CPC ......... *H04W 72/042* (2013.01); *H04W 72/02* (2013.01); *H04W 72/08* (2013.01); *H04W 72/087* (2013.01)

(58) Field of Classification Search
CPC ............... H04W 72/042; H04W 68/02; H04W 72/0446; H04W 72/046; H04W 88/02;
(Continued)

(56) References Cited

U.S. PATENT DOCUMENTS

| 2012/0093118 A1 | 4/2012 | Peters et al. |
| 2014/0050159 A1 | 2/2014 | Frenne et al. |

(Continued)

FOREIGN PATENT DOCUMENTS

| CN | 104012159 A | 8/2014 |
| CN | 105979597 A | 9/2016 |

(Continued)

OTHER PUBLICATIONS

Chincholi with U.S. Appl. No. 62/292,140, filed Feb. 5, 2016 (Year: 2016).*

(Continued)

*Primary Examiner* — Wutchung Chu
(74) *Attorney, Agent, or Firm* — Nicholson De Vos Webster & Elliott LLP

(57) ABSTRACT

Embodiments of the present disclosure provide methods, devices and computer program for downlink control channel transmission and detection. According to one or more embodiments, a method implemented in a network device comprises: selecting, for a terminal device, at least one set of downlink control channel candidates from two or more sets of downlink control channel candidates. Each set of the two or more sets of the downlink control channel candidates is associated with a different communication level, each communication level corresponding to one or more of a
(Continued)

different set of aggregation levels, a different set of transmission formats, a different target block error rate (BLER), and a different target latency. The method further comprises transmitting, to the terminal device, the selected at least one set of downlink control channel candidates.

20 Claims, 5 Drawing Sheets

(58) Field of Classification Search
CPC .. H04B 7/0617; H04B 7/0639; H04B 7/0689; H04L 5/0048; H04L 5/0053
See application file for complete search history.

(56) References Cited

U.S. PATENT DOCUMENTS

| | | | |
|---|---|---|---|
| 2015/0201405 A1 | 7/2015 | Liu et al. | |
| 2017/0142591 A1* | 5/2017 | Vrzic | H04W 24/08 |
| 2017/0171842 A1* | 6/2017 | You | H04L 5/0048 |
| 2017/0230780 A1* | 8/2017 | Chincholi | H04W 4/70 |
| 2017/0230994 A1* | 8/2017 | You | H04W 72/042 |
| 2017/0310431 A1* | 10/2017 | Iyer | H04L 1/1861 |
| 2017/0332359 A1* | 11/2017 | Tsai | H04B 7/0639 |
| 2017/0332370 A1* | 11/2017 | Rico Alvarino | H04L 5/0048 |
| 2017/0359807 A1* | 12/2017 | Hong | H04W 52/325 |
| 2017/0366311 A1* | 12/2017 | Iyer | H04B 7/0482 |
| 2018/0019843 A1* | 1/2018 | Papasakellariou | H04L 1/1861 |
| 2018/0027576 A1* | 1/2018 | Kowalski | H04W 72/0406 370/329 |
| 2018/0034596 A1* | 2/2018 | Noh | H04L 1/1812 |
| 2018/0041858 A1* | 2/2018 | Sheng | H04L 1/0009 |
| 2018/0042042 A1* | 2/2018 | Li | H04W 72/1284 |
| 2018/0049097 A1* | 2/2018 | Chen | H04L 1/0003 |
| 2018/0054285 A1* | 2/2018 | Chen | H04B 7/0628 |
| 2018/0054800 A1* | 2/2018 | Yeo | H04W 68/02 |
| 2018/0092081 A1* | 3/2018 | Chen | H04W 72/1242 |
| 2018/0212732 A1* | 7/2018 | You | H04L 5/0051 |
| 2018/0234998 A1* | 8/2018 | You | H04W 72/042 |
| 2019/0149274 A1* | 5/2019 | Freda | H04L 5/0053 370/329 |
| 2019/0150176 A1* | 5/2019 | Pelletier | H04W 72/1247 370/329 |
| 2019/0190655 A1* | 6/2019 | Pan | H03M 13/356 |
| 2019/0215133 A1* | 7/2019 | Pan | H04L 1/0003 |
| 2019/0327012 A1* | 10/2019 | Park | H04W 4/06 |
| 2019/0342061 A1* | 11/2019 | Kim | H04W 72/0473 |

FOREIGN PATENT DOCUMENTS

| | | |
|---|---|---|
| JP | 2015-534326 A | 11/2015 |
| WO | 2010112086 A1 | 10/2010 |
| WO | 2016144140 A1 | 9/2016 |

OTHER PUBLICATIONS

3GPP TS 36.213 V13.2.0 (Aug. 2016), "Physical layer procedures," LTE, Evolved Universal Terrestrial Radio Access (E-UTRA); ETSI TS 136 213 V13.2.0, 3rd Generation Partnership Project; Technical Specification Group (Release 13), Aug. 31, 2016; 383 pages.
International Search Report and Written Opinion for Application No. PCT/CN2017/100266, dated Dec. 1, 2017, 11 pages.
Extended European Search report for Application No. 17761791.7, dated Nov. 30, 2018, 11 pages.
Huawei et al., "Channel Coding Schemes for URLLC Scenario," Aug. 22-26, 2016, 3GPP TSG RAN WG1 Meeting #86, R1-167214, 5 pages.
Nokia et al., "Evaluation Criteria for Control Channel Coding," Aug. 22-26, 2016, 3GPP TSG RAN WG1 #86, R1-167277, 3 pages.
Communication pursuant to Article 94(3) EPC for EP Patent Application No. 17761791.7, dated Aug. 9, 2019, 8 pages.
International Preliminary Report on Patentability for Application No. PCT/CN2017/100266, dated Apr. 11, 2019, 6 pages.
Examination Report, IN App. No. 201717032917, dated Nov. 27, 2019, 7 pages (with English Translation).
Communication pursuant to Article 94(3) EPC for EP Patent Application No. 17761791, dated Jan. 14, 2020, 6 pages.
"3rd Generation Partnership Project; Technical Specification Group Radio Access Network; Evolved Universal Terrestrial Radio Access (E-UTRA); Physical channels and modulation (Release 13)," Jun. 2016, 168 pages, 3GPP TS 36.211, V13.2.0, 3GPP Organizational Partners.
Huawei, HiSilicon, "Scenario & Design Criteria on Flexible Numerologies", R1-162156, 3GPP TSG RAN WG1 Meeting #84bis, Apr. 11-15, 2016, 7 pages.
Office Action, KR App. No. 10-2019-7009842, Feb. 18, 2020, 9 pages (3 pages of English Translation and 6 pages of Original Document).
Zte, "Consideration on Channel Coding for NR", R1-166413, 3GPP TSG RAN WG1 #86, Aug. 22-26, 2016, pp. 1-12.

* cited by examiner

METHODS AND DEVICES FOR DOWNLINK CONTROL CHANNEL TRANSMISSION AND DETECTION IN A WIRELESS COMMUNICATION SYSTEM

CROSS-REFERENCE TO RELATED APPLICATIONS

This application is a National stage of International Application No. PCT/CN2017/100266, filed Sep. 1, 2017, which claims priority to International Application No. PCT/CN2016/101225, filed Sep. 30, 2016, which are hereby incorporated by reference.

TECHNICAL FIELD

The non-limiting and example embodiments of the present disclosure generally relate to a technical field of wireless communications, and specifically to methods, devices and computer programs for downlink control channel transmission and detection.

BACKGROUND

This section introduces aspects that may facilitate a better understanding of the disclosure. Accordingly, the statements of this section are to be read in this light and are not to be understood as admissions about what is in the prior art or what is not in the prior art.

Fifth generation (5G) networks such as NR, New Radio are supposed to provide diverse applications or services by using the same physical infrastructure. FIG. 1 schematically shows an example 5G network 100. As illustrated in FIG. 1, the network 100 may support multiple types of mobile network services, e.g., services 120-1, 120-2, 120-3, via a common Radio Access Network (RAN) 110. Those different types of mobile network services 120-1, 120-2, 120-3 are independent one another in a logic level but may be implemented in the same physical infrastructure. Depending on different Quality of Services (QoS) requirements, these mobile network services may be classified into three main types: Ultra-Reliable and Low Latency Communication (URLLC) 120-1, enhanced Mobile BroadBand (eMBB) 120-2, massive Machine Type Communication (mMTC) 120-3.

URLLC 120-1, e.g., being used in automatic drive/automatic control, has strict QoS requirements, especially in terms of latency and reliability. However, such URLLC services usually also has relatively low data rate and possible sparse data transmission.

mMTC 120-2, e.g., being used in intelligent agriculture, typically supports high connection density and requires long battery lifetime but does not require low delay or high data rate, often combined with small infrequent packets;

eMBB 120-3, e.g., being used in HD video service, requires high data rate. Delay can be strict but typically less strict than in URLLC.

In order to fulfill the delay requirement of different services, it is agreed in the RAN 1 (such as RAN 110 in FIG. 1) to introduce mixed numerologies in one carrier so that the services mentioned above can be served over one carrier.

A network, such as the fourth generation (4G) network, relies on the retransmission functionalities in multiple layers to avoid packet loss in the whole transmission path including the transport network and RAN network. Some example retransmission functionalities include Automatic Repeat Request (ARQ) in Transmission Control Protocol (TCP) layer, Packet Data Convergence Protocol (PDCP) and Radio Link Control (RLC) and Hybrid Automatic Repeat Request (HARQ) in Media Access Control (MAC) layer. For different services, there are different configurations of the mentioned layers according to the QoS requirement. For eMBB, the data is not so delay sensitive but the data rate should be as high as possible and the packet loss should be avoided. Hence the data retransmission of all layers shall be applied to avoid the packet loss. For real time video traffic, the TCP retransmission may not be applicable due to the delay budget and the data retransmission robustness relies on the RAN retransmission functionality such as RLC and MAC. For URLLC, the retransmission of TCP, PDCP and RLC may not be applicable due to URLLC's extremely small delay budget and therefore, the robustness of the data transmission mainly relies on the enhancement of the initial transmission and HARQ retransmissions.

SUMMARY

Therefore, in order to meet the requirements of high reliability and low latency, it is very important for URLLC to adopt efficient downlink control channels.

Current available downlink control channel designs may not be suitable for URLLC. On one hand, the Physical Downlink Control Channel (PDCCH) design for mMTC (i.e., MTC Physical Downlink Control Channel, or MPDCCH) is not suitable for URLLC. In mMTC, the downlink control channel is spanned in time domain. This span will increase the latency of control/data receiving, which is not allowed in URLLC. On the other hand, the downlink control channel design for enhanced Physical Downlink Control Channel (ePDCCH) is not fully optimized for URLLC either. The current ePDCCH design uses different aggregation levels for different cases. These cases are associated with the number of available symbols in the ePDCCH resource allocation and the information bits in each DCI. It does not consider different QoS requirements for different URLLC traffic types. As a result, the transmission of downlink control channel is not efficient for URLLC service.

In order to solve at least part of the above problems, methods, devices and computer programs are provided in the present disclosure. It can be appreciated that embodiments of the present disclosure are not limited to URLLC scenario, but could be more widely applied to any application scenario where similar problems exist.

Various embodiments of the present disclosure mainly aim at providing methods, devices and computer programs for downlink control channel transmission between a transmitter and a receiver, for example, for ultra-reliable and low latency communication (URLLC). Each of the transmitter and the receiver could be, for example, a network device or a terminal device. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the present disclosure, there is provided a method implemented at a network device. The method comprises: selecting, for a terminal device, at least one set of downlink control channel candidates from two or more sets of downlink control channel candidates, where each set of the two or more sets of the downlink control channel candidates is associated with a different communication level, each communication level corresponding to one or more of a different set of aggregation levels, a different set of transmission formats, a different target block error rate (BLER), and a different target latency. The method further comprises transmitting, to the terminal device, the selected at least one set of downlink control channel candidates.

According to one or more embodiments of the first aspect of the present disclosure, at least one communication level may target a Quality of Service, QoS, requirement of Ultra-Reliable and Low-Latency Communication (URLLC) communication.

According to one or more embodiments of the first aspect of the present disclosure, the QoS requirement may include a requirement on the BLER and/or latency.

According to one or more embodiments of the first aspect of the present disclosure, at least one communication level may satisfy a Quality of Service, QoS, requirement of BLER lower than a first threshold, and at least another communication level satisfies a QoS requirement lower than a second threshold.

According to one or more embodiments of the first aspect of the present disclosure, at least one communication level may satisfy a Quality of Service, QoS, requirement of URLLC and at least another communication level may satisfy a QoS requirement of enhanced mobile broadband (eMBB) communication.

According to one or more embodiments of the first aspect of the present disclosure, one communication level may correspond to a transmission format with a different number of control information bits than the transmission format of another communication level.

According to one or more embodiments of the first aspect of the present disclosure, one of the communication levels may correspond to (i) an aggregation level as high as or higher than in any other communication level, (ii) a transmission format that includes a number of control information bits that is as low as or lower than in any other communication level, and (iii) a target BLER and/or target latency that is as low as or lower than in any other communication level.

According to one or more embodiments of the first aspect of the present disclosure, repetition for at least one communication level may be in at least the frequency domain.

According to a second aspect of the present disclosure, there is provided a method implemented at a terminal device. The method comprises determining at least one set of downlink control channel candidates from two or more sets of downlink control channel candidates, wherein each set of the two or more sets of downlink control channel candidates is associated with a different communication level, each communication level corresponding to one or more of a different set of aggregation levels, a different set of transmission formats, a different target block error rate (BLER), and a different target latency. The method further comprises detecting a downlink control channel in the determined at least one set of downlink control channel candidates.

According to a third aspect of the present disclosure, there is provided a network device. The network device comprises a transmitter, a receiver, a processor, and a memory. The network device is configured to select, for a terminal device, at least one set of downlink control channel candidates from two or more sets of the downlink control channel candidates, wherein each set of the two or more sets of the downlink control channel candidates are associated with one or more communication levels. The network device is also configured to transmit, to the terminal device, the selected at least one set of the downlink control channel candidates.

According to a fourth aspect of the present disclosure, there is provided a terminal device. The terminal device comprises a transmitter, a receiver, a processor, and a memory. The terminal device is configured to determine at least one set of downlink control channel candidates from two or more sets of downlink control channel candidates, wherein each set of the two or more sets of downlink control channel candidates is associated with a different communication level, each communication level corresponds to one or more of a different set of aggregation levels, a different set of transmission formats, a different target block error rate (BLER), and a different target latency. The terminal device is also configured to detect a downlink control channel in the determined at least one set of downlink control channel candidates.

According to a fifth aspect of the present disclosure, there is provided a network device. The network device comprises a processor and a non-transitory machine readable storage medium. The non-transitory machine readable storage medium contains instructions that, when executed on the processor, cause the network device to perform the method of the first aspect of the present disclosure.

According to a sixth aspect of the present disclosure, there is provided a terminal device. The terminal device comprises a processor and non-transitory machine readable storage medium. The non-transitory machine readable storage medium contains instructions that, when executed on the processor, cause the terminal device to perform the method of the second aspect of the present disclosure.

According to a seventh aspect of the present disclosure, there is provided a computer program, comprising instructions which, when executed on one or more processors, cause the one or more processors to carry out the method of the first aspect of the present disclosure.

According to an eighth aspect of the present disclosure, there is provided a computer program, comprising instructions which, when executed on one or more processors, cause the one or more processors to carry out the method of the second aspect of the present disclosure.

According to embodiments of the present disclosure, different communication levels reflecting service requirements are taken into account when defining downlink control channels. In some embodiments, for URLLC services, the design of downlink control channels may consider aggregation levels, transmission formats, a target block error rate (BLER), and/or a target latency. Therefore, the downlink control channels may reduce the latency and increase the reliability of terminal devices in URLLC. Also, the resource efficiency (e.g., in frequency domain and/time domain) may be improved for the whole system.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
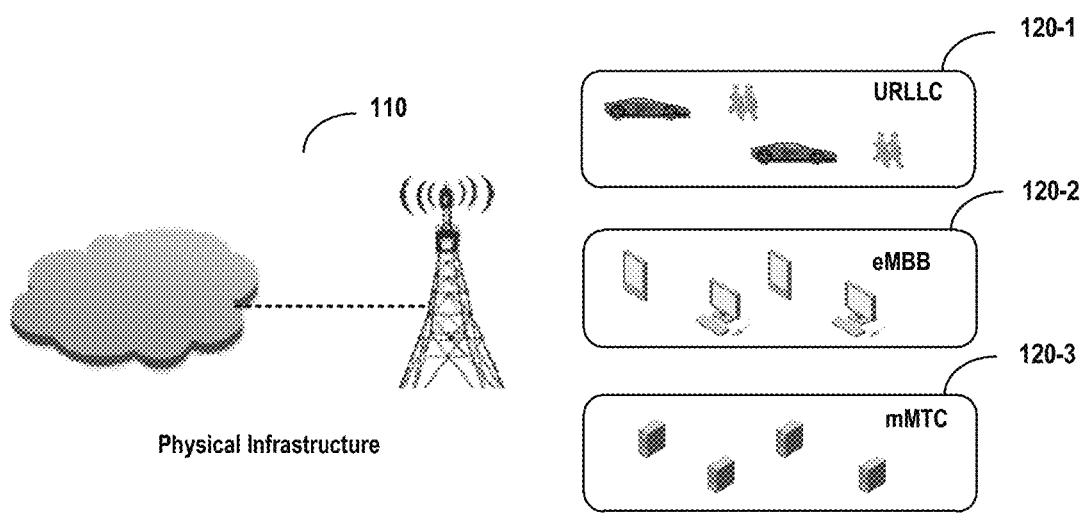
FIG. 1 illustrates an example wireless communication network 100 in which embodiments of the disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a "first" element could also be referred to as a "second" element, and similarly, a "second" element could also be referred to as a "first" element, without departing from the scope of example embodiments. As used herein, the term "and/or" includes any and all combinations of one or more of the associated listed items.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth, depending on the applied terminology and technology.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As discussed in the above, current available downlink control channel designs, e.g., both ePDCCH and MPDCCH, may be not suitable to achieve the high-reliability and low-latency of URLLC. To facilitate the understanding of URLLC downlink control channel design according to various embodiments of the present disclosure, it may be helpful to first introduce the current existing ePDCCH and MPDCCH designs.

ePDCCH

In Long Term Evolution (LTE) systems, PDCCH and ePDCCH are used for downlink control channel information transmission. In Section 9.1.4 of 3GPP TS 36.213 V13.2.0, three cases for ePDCCH are defined as follows:

Case 1:
for normal subframes and normal downlink Cyclic Prefix (CP) when Downlink Control Information (DCI) formats 2/2A/2B/2C/2D are monitored and $\hat{N}_{RB}^{DL} \geq 25$, or
for frame structure type 3, for downlink subframes with Physical Downlink Shared Channel (PDSCH) transmissions starting in the second slot,
for special subframes with special subframe configuration 3, 4, 8 for frame structure type 2 or the subframes following DwPTS duration of special subframe configuration 3, 4, 8 for frame structure type 3, and normal downlink CP when DCI formats 2/2A/2B/2C/2D are monitored and $\hat{N}_{RB}^{DL} \geq 25$, or
for normal subframes and normal downlink CP when DCI formats 1A/1B/1D/1/2A/2B/2C/2D/0/4/5/6-0A/6-0B/6-1A/6-1B are monitored, and when $n_{EPDCCH} < 104$ ($n_{EPDCCH}$ defined in subclause 6.8A.1 in 3GPP TS 36.211 V13.2.0), or
for special subframes with special subframe configuration 3, 4, 8 for frame structure type 2 or the subframes following DwPTS duration of special subframe configuration 3, 4, 8 for frame structure type 3, and normal downlink CP when DCI formats 1A/1B/1D/1/2A/2/2B/2C/2D/0/4/5/6-0A/6-0B/6-1A/6-1B are monitored, and when $n_{EPDCCH} < 104$ ($n_{EPDCCH}$ defined in subclause 6.8A.1 in 3GPP TS 36.211 V13.2.0);

Case 2:
for normal subframes and extended downlink CP when DCI formats 1A/1B/1D/1/2A/2/2B/2C/2D/0/4/5/6-0A/6-0B/6-1A/6-1B are monitored or,
for special subframes with special subframe configuration 1, 2, 6, 7, 9 for frame structure type 2 or the subframes following DwPTS duration of special subframe configuration 1, 2, 6, 7, 9 for frame structure type 3, and normal downlink CP when DCI formats 1A/1B/1D/1/2A/2/2B/2C/2D/0/4/5/6-0A/6-0B/6-1A/6-1B are monitored, or
for special subframes with special subframe configuration 1, 2, 3, 5, 6 and extended downlink CP when DCI formats 1A/1B/1D/1/2A/2/2B/2C/2D/0/4/5/6-0A/6-0B/6-1A/6-1B are monitored;
otherwise
Case 3 is applied.

For Case 1, it is applied for the larger DCI formats or for small effective enhanced Control Channel Element (eCCE) sizes (due to collision between enhanced Resource Element Groups (eREGs) and other signals) as well as for some special subframe configurations; for Case 2, it is applied for extended cyclic prefix and for some special subframe configurations; for Case 3, it is applied otherwise (e.g., smaller DCI formats in normal subframes with normal CP).

For different cases, the aggregation levels for the ePDCCH candidates may be different. As an example, for Case 1, the aggregation level L is {2, 4, 8, 16, 32} and for case 2, the aggregation level L is {1, 2, 4, 8, 16}. The blind detection for each possible candidate may also be different. For Case 2 and Case 3, the aggregation level for each possible candidate is {1, 2, 4, 8, 16}; however, the blind detection for L=1 is 4 when ePDCCH Physical Resource Block (PRB)-set size $N_{RB}^{X_p}=2$ and the blind detection for L=1 is 8 when $N_{RB}^{X_p}=2$.

TABLE 1

EPDCCH candidates monitored by a UE
(One Distributed EPDCCH-PRB-set - Case1, Case 2)

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

TABLE 2

EPDCCH candidates monitored by a UE
(One Distributed EPDCCH-PRB-set - Case 3)

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

MPDCCH

To support eMTC, MPDCCH is extended based on the ePDCCH. The main extension is to repeat downlink control channel transmission in time domain so as to enhance the coverage. To have different coverage extensions (CEs), candidates with different aggregation levels and repetitions can be configured, which is shown in Table 3 and Table 4.

The detailed description of MPDCCH can be found in Section 9.1.5 of 3GPP TS 36.213 V13.2.0. For example, for CE Mode A, the aggregation level L can be {2, 4, 8, 16}, and for CE Mode B, the aggregation level L can be {8, 16} when the MPDCCH-PRB-set size is 2 PRBs. For different CE modes, the repetition and the blind detection trials may be different, since CE Mode B have much larger coverage and hence more aggregation is needed.

TABLE 3

MPDCCH candidates monitored by a BL/CE UE
(CE Mode A, MPDCCH-PRB-set size - 2PRBs or 4PRBs)

| $N'_{RB}{}^{X_p}$ | Repetition in time domain | $M'_p{}^{(L')}$ | | | | |
|---|---|---|---|---|---|---|
| | | L' = 2 | L' = 4 | L' = 8 | L' = 16 | L' = 24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

TABLE 4

MPDCCH candidates monitored by a BL/CE UE
(CE Mode B, MPDCCH-PRB-set size - 2PRBs or 4PRBs)

| $N'_{RB}{}^{X_p}$ | R | $M'_p{}^{(L')}$ | | | | |
|---|---|---|---|---|---|---|
| | | L' = 2 | L' = 4 | L' = 8 | L' = 16 | L' = 24 |
| 2 | r1 | 0 | 0 | 1 | 0 | 0 |
| 4 | | 0 | 0 | 1 | 1 | 0 |
| 2 | r2 | 0 | 0 | 1 | 0 | 0 |
| 4 | | 0 | 0 | 1 | 1 | 0 |
| 2 | r3 | 0 | 0 | 1 | 0 | 0 |
| 4 | | 0 | 0 | 1 | 1 | 0 |
| 2 | r4 | 0 | 0 | 1 | 0 | 0 |
| 4 | | 0 | 0 | 1 | 1 | 0 |

$N'_{RB}{}^{X_p}$ is the number of PRB-pairs configured for MPDCCH UE-specific search space. The repetitions (R) r1, r2, r3, and r4 are determined from Table 5 by substituting the value of $r_{max}$ with the value of higher layer parameter mPDCCH-NumRepetition.

TABLE 5

Determination of repetition levels

| $r_{max}$ | r1 | r2 | r3 | r4 |
|---|---|---|---|---|
| 1 | 1 | — | — | — |
| 2 | 1 | 2 | — | — |
| 4 | 1 | 2 | 4 | — |
| >=8 | $r_{max}/8$ | $r_{max}/4$ | $r_{max}/2$ | $r_{max}$ |

In MPDCCH, the repetition is performed in time domain, since MTC is bandwidth limited system and it is delay tolerated. Thus, the repetition spanned in time domain is applicable.

It can be seen that downlink control channel designs for ePDCCH and MPDCCH cannot meet the strict QoS requirements of URLLC. EPDCCH is designed to use different aggregation levels for different cases, which are associated with the number of available symbols in the ePDCCH resource allocation and the information bits in each DCI. Such classification of scenario cases does not reflect different QoS requirements for different URLLC traffic types. As a result, the transmission of downlink control channel is not efficient for URLLC service. MPDCCH is designed to span in time domain so as to enhance the coverage. However, this span will increase the latency of control/data transmission/retransmission, of which URLLC is not tolerant.

In order to solve at least part of the above problems, various embodiments of the present disclosure aim to provide an efficient downlink control channel (e.g., uPDCCH) design for high-reliability and low-latency wireless communications, such as URLLC. Although embodiments are described herein with reference to the URLLC scenario, it can be appreciated that embodiments of the present disclosure are not limited to the URLLC scenario, but could be more widely applied to any application scenario where similar problems exist.

Figure 2:
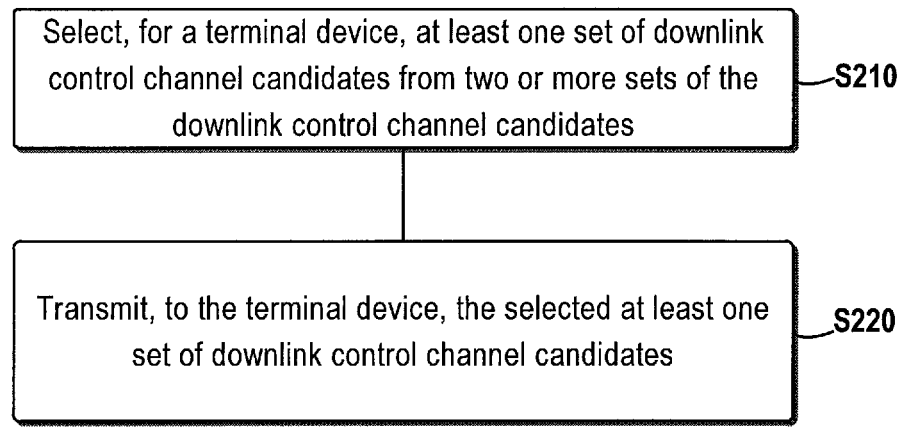
FIG. 2 illustrates a flowchart of a method 200 implemented at a network device according to one or more embodiments of the present disclosure.

FIG. 2 illustrates a flowchart of a method 200 implemented at a network device according to one or more embodiments of the present disclosure. As shown in FIG. 2, in block S210, the network device selects for a terminal device, at least one set of downlink control channels from two or more sets of downlink control channel candidates. Each set of the two or more sets of the downlink control channel candidates is associated with a different communication level. Different communication levels may refer to different communication modes. Among the different communication modes, a first communication mode may target for a Quality of Service, QoS, requirement of Ultra-Reliable and Low-Latency Communication (URLLC) communication and a second communication mode may target for a Quality of Service, QoS, requirement of enhanced mobile broadband (eMBB) communication. The information of the communication level may be transmitted from the network device (for example, an eNB) to the terminal device.

In embodiments of the present disclosure, each communication level corresponds to one or more of a different set of aggregation levels, a different set of transmission formats, a different target block error rate (BLER), and a different target latency. In block S220, the network device transmits to the terminal device the selected at least one set of the downlink control channels according to transmission parameters that are associated with the selected at least one set of downlink control channel candidates.

In an embodiment, before block S210, the network device may send a signaling to the terminal device to configure a state of the terminal device, where the state of the terminal device is associated with at least one communication level. In that situation, the network device can be aware of which communication level the terminal device belongs to.

Alternatively, the network device may have the knowledge of communication level of the terminal device without sending any signaling to inform the terminal device of that. For example, the network device may be aware of the communication level from higher layer application or signaling.

In embodiments of the present disclosure, with the knowledge of which communication level the terminal device belongs to, the network device may select the at least one set of downlink control channel candidates for the terminal device.

Figure 3:
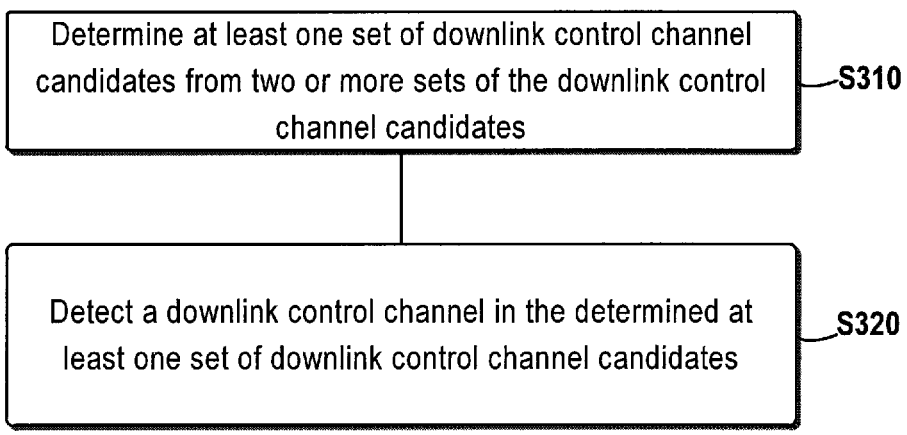
FIG. 3 illustrates a flowchart of a method 300 implemented at a terminal device according to one or more embodiments of the present disclosure.

FIG. 3 illustrates a flowchart of a method 300 implemented at a terminal device according to one or more embodiments of the present disclosure. As shown in FIG. 3, at receiving side, the terminal device determines, in block S310, at least one set of downlink control channel candidates from two or more sets of downlink control channel candidates. Each set of the two or more sets of downlink control channel candidates is associated with a different communication level. In embodiments of the present disclosure, as mentioned above, each communication level corresponds to one or more of a different set of aggregation levels, a different set of transmission formats, a different BLER, and a different target latency. In block S320, the terminal device detects a downlink control channel in the determined at least one set of downlink control channel candidates.

In an embodiment, the terminal device may receive a signaling to the terminal device to configure a state of the terminal device, where the state of the terminal device is associated with at least one communication level. In that situation, the terminal device can determine its communication level based on the configured state.

Alternatively, the terminal device may determine its communication level without receiving any signaling from the network device. For example, the terminal device may determine its communication level based on QoS requirements of the service currently involved.

In one or more embodiments of the present disclosure, a plurality of sets of downlink control channel candidates may be designed for different URLLC levels. A URLLC level may be defined, for example, according to a Quality of Service, QoS, requirement of URLLC communication. At least one communication level of the terminal device targets a URLLC level, and thus targets a QoS requirement of URLLC communication.

In some embodiments, a QoS requirement may include a requirement on latency and/or reliability (which may be represented by a packet loss rate and/or a BLER). The requirement on the latency and/or reliability is referred to as a QoS requirement herein for clarification and ease of discussion, and concepts disclosed herein are not limited to any specific parameters or requirements. In addition, a downlink control channel may be interchangeably referred to herein as PDCCH, uPDCCH, mPDCCH, and ePDCCH, etc.

According to one specific embodiment of the present disclosure, two URLLC levels (corresponding to two QoS requirements for URLLC communication) may be defined, which is shown in Table 6. It should be appreciated that although the description given herein focus on two URLLC levels, the concepts disclosed herein are not limited to two URLLC levels. In a first URLLC level, the BLER target is $10^{-9}$ and the latency (the delay budget in air interface, same meaning herein after) is less than 0.2 ms, and in a second URLLC level, the BLER target is $10^{-6}$ and the latency is less than 0.5 ms.

TABLE 6

Definition of URLLC Level

| URLLC level | QoS requirements | Downlink Control Channels |
| --- | --- | --- |
| Level 1 | BLER <= $10^{-9}$ and latency < 0.2 ms | The first set of downlink control channel(s) |
| Level 2 | BLER <= $10^{-6}$ and latency < 0.5 ms | The second set of downlink control channel(s) |

In this embodiment, different communication levels may target the QoS requirements for the different URLLC levels. Specifically, at least one communication level may satisfy a QoS requirement of BLER lower than a first threshold (for example, lower than $10^{-9}$), and at least another communication level may satisfy a QoS requirement of BLER lower than a second threshold (for example, $10^{-6}$). The requirements on the latency may be similarly taken into account into the communication levels. Further, depending on the URLLC levels, two sets of downlink control channel candidates are designed. For URLLC level 1, a first set of downlink control channel candidates can be used, while for URLLC level 2, a second set of downlink control channel candidates, which may be different from the first set, can be used.

In some embodiments, in addition to the URLLC communication, there may exist other types of communications, such as eMBB communication. The eMBB communication may have a corresponding QoS requirement. In this case, at least one communication level (for example, the first communication mode) may satisfy a QoS, requirement of URLLC and at least another communication level (for example, the second communication mode) may satisfy a QoS requirement of the eMBB communication.

In some embodiments, different communication levels may correspond to one or more different transmission parameters for the downlink control channels. That means transmission parameters for downlink control channels may be determined based on the set of downlink control channel candidates that is associated with the corresponding communication level.

According to one or more embodiments of the present disclosure, the transmission parameters include at least one item selected from a group of: transmission formats for the downlink control channels; transmission powers for the downlink control channels; and bandwidths for the downlink control channels. At least one of the transmission parameters corresponding to a communication level may be different from that corresponding to another communication level.

A transmission format may comprise, but is not limit to, one or more of the following aspects: control information bits for downlink control channels, an aggregation level/ resource allocation, a target BLER and/or target latency, the number of downlink control channel candidates/blind detection attempts, a repetition manner, a resource mapping, and/or a transmission scheme. The influence of different aspects of the transmission format on the communication level (and thus on the associated set of downlink control channel candidates) will be described in details below.

Control Information Bits for Downlink Control Channels

In some embodiments, one communication level may correspond to a transmission format with a different number of control information bits than the transmission format of another communication level. In one specific embodiment, one communication level may correspond to a transmission format that includes a number of control information bits that is as low as or lower than in any other communication levels. In this way, in some embodiments, different numbers of control information bits may be used for downlink control channel candidates within different sets of downlink control channel candidates. In other embodiments, the number of control information bits may also be the same for all the sets of downlink control channel candidates.

Considering an example of two sets of downlink control channel candidates, for a first set of downlink control channel candidates, less control information bits may be used and for a second set of downlink control channel candidates, more control information bits are used. As another example, for the first set of control channels, some control information field may be reduced. This non-signaled information may rely on terminal blind detection, and/or some information may be predefined, etc. For instance, the number of information bits for resource allocation, Modulation and Coding Scheme (MCS) indication and rank indication can be reduced since large transport block, high modulation order and high rank transmission are not necessary for URLLC. As another example, the HARQ process number can be reduced for the first set of downlink control channels, because for URLLC service, too much HARQ retransmission shall be avoided.

Aggregation Levels/Resource Allocation(s)

In some embodiments, one communication level may correspond to a transmission format with a different aggregation level than the transmission format of another communication level. In one specific embodiment, one communication level may correspond to an aggregation level as high as or higher than in any other communication level. In this way, in some embodiments, different aggregation levels may be used for downlink control channel candidates within different sets of downlink control channel candidates. In other embodiments, the aggregation levels may also be the same for all the sets of downlink control channel candidates.

Figure 4:
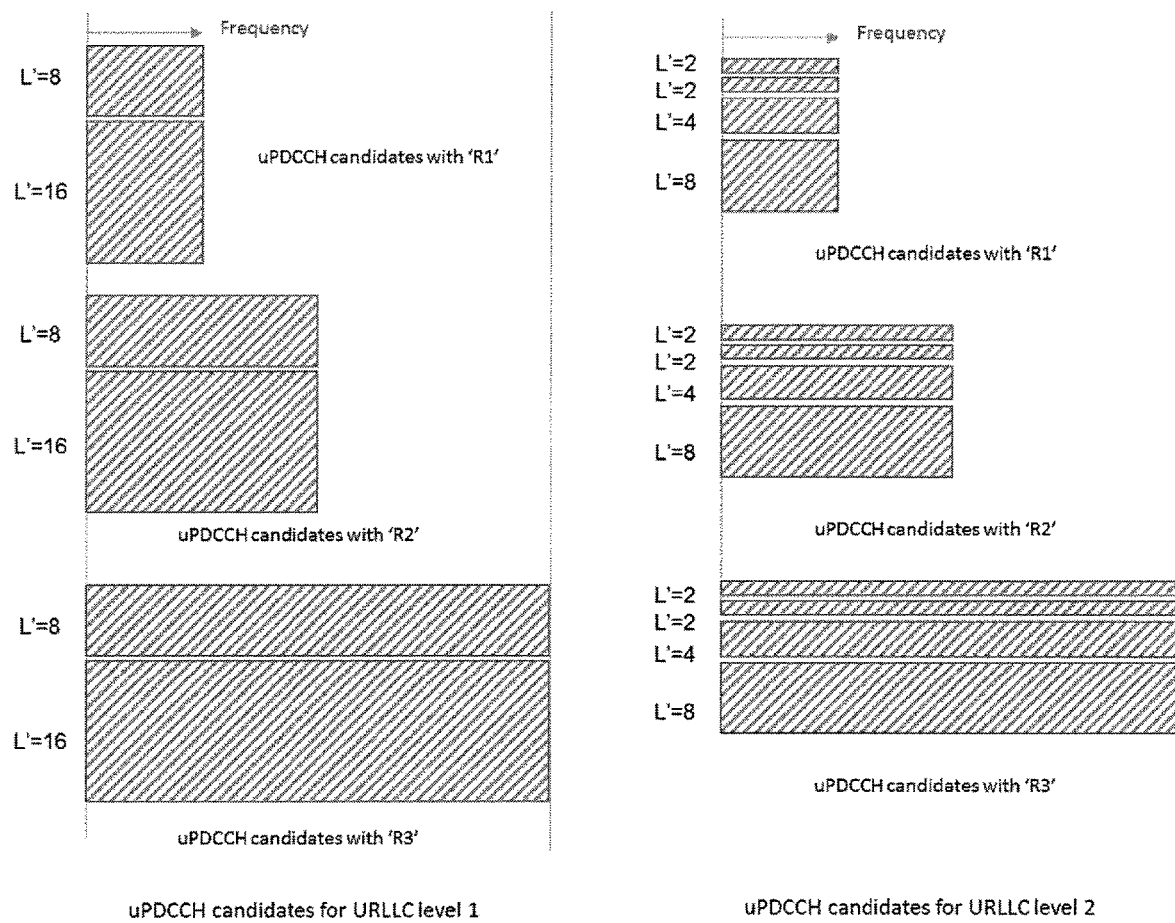
FIG. 4 illustrates a schematic diagram of downlink control channel search space for different sets of downlink control channels.

For example, consider two set of downlink control channels associated with two UCLLC levels. FIG. 4 illustrates a schematic diagram of downlink control channel search space for different URLLC levels. As illustrated in FIG. 4, for the first set of downlink control channels, more resource elements can be aggregated for each downlink control channel candidate and for the second set of control channels, less resource elements can be aggregated for each downlink control channel candidate. More specifically, the candidate for the first set of downlink control channels may have aggregation level L'{8, 16} and the candidate for the second set of downlink control channels may have aggregation level L'{2, 4, 8}.

Target BLER and/or Target Latency

In some embodiments, one communication level may correspond to a transmission format with a different target BLER and/or target latency than the transmission format of another communication level. In other embodiments, one communication level may correspond to a target BLER and/or target latency the same as any other communication level. In this way, in some embodiments, different target BLERs and/or target latency may be used for downlink control channel candidates within different sets of downlink control channel candidates. In other embodiments, the target BLER and/or target latency may also be the same for all the sets of downlink control channel candidates.

Candidates for Downlink Control Channel Candidates/Blind Detection Attempts

Similarly, different communication levels may correspond to different transmission formats with different numbers of candidates for downlink control channels. Thus, the number of candidates for downlink control channels may be different for different sets of downlink control channel candidates. For example, considering two set of downlink control channel candidates associated with two UCLLC levels, to reduce the processing latency, for the first set of downlink control channel candidates, only fewer candidates (e.g., 1 candidate) are possible for the terminal device to perform blind detection. It can increase the reliability and reduce the latency. For the second set of downlink control channel candidates, more downlink control channel candidates for UE blind detection is possible.

For each aggregation level of each set of downlink control channel candidates, there can be a plurality of configurations for a candidate for blind decoding in order to limit the blind detection attempts in terminal side. As an example, the number of candidates for low aggregation level can be configured to be smaller than the maximum number of candidate position determined by the DCI search space size. That is, the search space of low aggregation level transmission can be smaller than the whole configured DCI search space for the terminal device.

Repetition Manner

The repetition manners may be defined based on repetition times in a frequency domain and/or time domain. Similarly, in some embodiments, different communication levels may correspond to different transmission formats with different repetition manners for downlink control channels. The repetition for at least one communication level may be in at least the frequency domain. Additionally, the repetition may also be in the time domain. In these embodiments, the repetition manners may be different for different sets of downlink control channel candidates.

Refer to FIG. 4 again, which schematically shows different repetition manners for different two sets of downlink control channel candidates. For the first set of downlink control channel candidates, the repetition may be in the frequency domain. For the second set of downlink control channel candidates, the repetition may be in both frequency domain and time domain. For the first set of downlink control channel candidates, when repetition is performed in the frequency domain, it can reduce the latency. With the repetition, it can increase the reliability for each transmission, thus further reduce the latency. For the second set of downlink control channel candidates, the repetition is performed in both frequency domain and time domain. With these design, power can be concentrated into few PRBs, it can be used to improve the coverage. The latency may be reduced a bit but fewer PRBs in frequency domain are needed for the allocation, which may lead to a more efficient resource allocation.

Resource Mapping

Similarly, different communication levels may correspond to different transmission formats with different resource mappings for downlink control channels. Thus, the resource mappings may be different for different sets of downlink control channel candidates.

For example, for a first set of downlink control channels, it may be mapped in the beginning of scheduled TTIs, so that the latency is reduced. A downlink control channel candidate is TDMed with a data channel or another downlink control channel. For the second set of control channel candidates, it is possible to be mapped in the frequency domain first. A downlink control channel candidate is FDMed with a data channel or another downlink control channel.

For the first set of downlink control channel candidates, distributed resource may be allocated, and for the second set of downlink control channel candidates, localized resource may be allocated. With the distributed resource allocation, it can increase the frequency diversity and thus improve the reliability.

Transmission Schemes

Similarly, different communication levels may correspond to different transmission formats with different transmission schemes for downlink control channels. Thus, the transmission schemes may be different for different sets of downlink control channel candidates.

Considering an example of two sets of downlink control channel candidates, for the first set of downlink control channel candidates, more robust transmission schemes may be employed. For example, the spatial diversity scheme, frequency diversity scheme, time diversity scheme and any combination of them can be used for the first set of downlink control channel candidates. As another example, narrow beams may be used for transmission of the first set of downlink control channel candidates and a bit wider beam is used for transmission of the second set of downlink control channel candidates.

The reference signal density or power boost may be different for the different sets of downlink control channel candidates. The reference signal density or power boost may be higher for the first set than the set.

Alternatively, or in addition, the channel coding scheme may be different. For example, more robust encoding schemes may be used for the first set. As another example, the encoding which can achieve better performance in lower coding rate can be selected as the encoding scheme.

The transmission formats has been described above. In some additional or alternative embodiments, different communication levels may correspond to different transmission powers for the downlink control channels. As a result, different transmission powers for the downlink control channels may be employed for different sets of downlink control channel candidates. Considering an example of two downlink control channel sets, for the first set of downlink control channels, higher power boost may be employed and for the second set of downlink control channels, no power boost or lower power boost may be employed.

Alternatively, or addition, different communication levels may correspond to different bandwidths for the downlink control channels. As a result, different bandwidths for the downlink control channels may be employed for different sets of downlink control channel candidates. Considering an example of two downlink control channel sets, for the wider bandwidth, the first set of downlink control channel candidates may be used and for the narrow bandwidth, the second set of downlink control channel candidates may be used. For the wider bandwidth, more information bits for resources allocation may be expected. Hence, more resource is needed to carry these bits. Otherwise, few bits are needed and thus less resource is needed accordingly.

It should be understood that the above transmission parameters are discussed just as examples without any limitation. Those skilled in the art can configure any suitable transmission parameters for different sets of downlink control channels so as to meet required service demands.

With reference to FIG. 4, Tables 7 and 8, an example downlink control channel design according to one embodiment of the present disclosure is discussed for the purpose of illustration.

Considering the example of Table 6, two sets of downlink control channel candidates are defined based on URLLC Level 1 and URLLC Level 2. The transmission parameters, such as the transmission format with an aggregation level L' and blind detection trials (i.e., the number of uPDCCH candidates $M'^{(L')}_p$), may be set as different between the two sets. FIG. 4 shows a downlink control channel search space for different sets of downlink control channel candidates. For the purpose of clarity and conciseness, the downlink control channels designed for URLLC is referred to as uPDCCH hereafter. The uPDCCH candidates monitored by a URLLC terminal device can be given as Table 7 and Table 8, where Table 7 corresponds to the first set of uPDCCH(s), which is associated with URLLC Level 1 and Table 8 corresponds to the second set of uPDCCH(s), which is associated with URLLC Level 2.

TABLE 7 uPDCCH candidates monitored by a URLLC terminal device
(URLLC Level 1, uPDCCH-PRB-set size - 2PRBs or 4PRBs)

| $N'^{X_p}_{RB}$ | Repetition in frequency domain | $M'^{(L')}_p$ | | | |
|---|---|---|---|---|---|
| | | L' = 2 | L' = 4 | L' = 8 | L' = 16 |
| 2 | r1 | 2 | 1 | 1 | 0 |
| 4 | | 1 | 1 | 1 | 1 |
| 2 | r2 | 2 | 1 | 1 | 0 |
| 4 | | 1 | 1 | 1 | 1 |
| 2 | r3 | 2 | 1 | 1 | 0 |
| 4 | | 1 | 1 | 1 | 1 |
| 2 | r4 | 2 | 1 | 1 | 0 |
| 4 | | 1 | 1 | 1 | 1 |

TABLE 8 uPDCCH candidates monitored by a URLLC UE
(URLLC Level 2, uPDCCH-PRB-set size - 2PRBs or 4PRBs)

| $N'^{X_p}_{RB}$ | Repetition in frequency domain | $M'^{(L')}_p$ | | | |
|---|---|---|---|---|---|
| | | L' = 2 | L' = 4 | L' = 8 | L' = 16 |
| 2 | r1 | 0 | 0 | 1 | 0 |
| 4 | | 0 | 0 | 1 | 1 |
| 2 | r2 | 0 | 0 | 1 | 0 |
| 4 | | 0 | 0 | 1 | 1 |
| 2 | r3 | 0 | 0 | 1 | 0 |
| 4 | | 0 | 0 | 1 | 1 |
| 2 | r4 | 0 | 0 | 1 | 0 |
| 4 | | 0 | 0 | 1 | 1 |

In this example, the repetition in frequency domain can be configured by RRC signaling, or MAC signaling or predefined or any combination of them. The candidates for uPDCCH can be independent of other downlink control channels, such as mPDCCH for MTC or ePDCCH for eMBB.

Compared with PDCCH for mMTC (mPDCCH), uPDCCH according to this embodiment has following different features. First, the repetition for uPDCCH may be in frequency domain, which is distinguished from the time domain repetition scheme for mPDCCH. Further, the downlink control channel sets of mPDCCH are classified according to the coverage, while the downlink control channel sets of uPDCCH are classified according to predefined URLLC levels. The key differences between uPDCCH, mPDCCH and ePDCCH are listed in Table 9.

TABLE 9 the comparison between uPDCCH, mPDCCH and ePDCCH

| | mPDCCH (mMTC) | uPDCCH (URLLC) | ePDCCH (mBB) |
|---|---|---|---|
| Repetition | Repetition in time domain | Repetition in frequency domain | No repetition |
| Criteria for classification | Coverage | URLLC Level | DCI bits/subframe type/available REGs/bandwidth |

According to one embodiment of the present disclosure, the association between the sets of downlink control channel candidates and URLLC levels is explicitly or implicitly signaled or predefined in the specification or any combination of them.

In another embodiment of the present disclosure, the network device may optionally configure the terminal device state based on the URLLC level. The network device may select one set of downlink control channel transmission parameters from a plurality of sets of downlink control channel transmission parameters per the configured state of the terminal device or other condition, such as the traffic type for one terminal device or terminal type or the RAN slice type that the terminal device is camped on. The network device may further transmit the downlink control channel per the selected set of downlink control channel transmission parameters. As one example of the state, the terminal device may receive the traffic with an indicator of a specific URLLC level.

In another embodiment, the terminal device may implicitly or explicitly receive the signaling which configures the terminal device state, and the terminal device may determine the downlink control channel configuration based on the configured state or other conditions. The terminal device may further perform the downlink control channel detection based on the determined downlink control channel configuration.

In one embodiment, when the service is URLLC level 1, the network device informs the terminal device the downlink control channel candidate aggregation level is {4, 8, 16}, otherwise, when the service is URLLC level 2, the terminal device informs the terminal device the downlink control channel candidate aggregation level is {1, 2, 4}. When the terminal device is informed the aggregation level is {4, 8, 16}, the terminal device will perform blind detection with the assumption that the downlink control channel aggregation level is {4, 8, 16}. Otherwise, the terminal device will perform blind detection with the assumption that the downlink control channel aggregation level is {1, 2, 4}.

In another embodiment, it can be predefined that the control channel candidate aggregation level is selected from {4, 8, 16} if URLLC level 1 is configured and {1, 2, 4} if URLLC level 2 is configured. In case the terminal device is configured as URLLC level 1, aggregation levels {4, 8, 16} will be used, otherwise, {1, 2, 4} will be used. The URLLC level may be explicit signaling or implicit signaling or any combination of them.

Additionally or alternatively, one set of downlink control channels may be predefined as a default downlink control channel set.

In some embodiments, the downlink control channel may be used for data transmission. Also, it can be used for the other special messages transmission, such as paging, system information, messages related to random access, and etc.

According to one or more embodiments of the present disclosure, URLLC-level-adapting downlink control channels may be combined with other adaptive downlink control channel design. More particularly, each set of the two or more sets of the downlink control channels may be associated with a combination of one or more communication levels and one or more further classification criteria.

According to one embodiment, a further classification criterion may be the factors/parameters specifying the three cases for ePDCCH and/or the coverage modes specifying MPDCCH sets. Based on the combination of communication levels (e.g., the two URLLC levels) and at least one further classification criteria, multiple sets of PDCCH may be defined more precisely and effectively.

Assume first one or more sets of downlink control channel candidates are designed based on the three cases specified for ePDCCH in Section 9.1.4 of 3GPP TS 36.213 V13.2.0 such that each set of downlink control channels is associated with DCI formats, subframe type, bandwidth and the number of available REs for downlink control channels; second one or more sets of downlink control channel candidates are designed such that each set of downlink control channel candidates is associated with a coverage mode. On the top of the first one or more sets of downlink control channel candidates and the second one or more sets of downlink control channel candidates, the third one or more sets of downlink control channel candidates may be designed so that each set of downlink control channel candidates is associated with URLLC levels.

In one implementation, the first one or more sets of downlink control channel candidates may be subset or super set of the third one more sets of downlink control channel candidates or the same as the third one or more sets of downlink control channel candidates.

In another additional or alternative implementation, fourth sets of downlink control channel candidates may be designed for URLLC such that each set of the downlink control channel candidates is associated with DCI formats, subframe type, bandwidth, and the number of available REs in addition to URLLC level. The fourth sets of downlink control channel candidates are a combination of the first one or more sets of downlink control channel candidates and the third one or more sets of downlink control channel candidates. In this example, each set of downlink control channel candidates may be associated with a combination of two UCLLC levels defined in Table 6 and the three cases specified for ePDCCH as described with reference to Tables 1 and 2. The fourth sets of downlink control channel candidates may be illustrated by Table 10.

TABLE 10 the combined sets of downlink control channels

|  | Case 1 | Case 2 | Case 3 |
| --- | --- | --- | --- |
| URLLC level 1 | Set 1 | Set 2 | Set 3 |
| URLLC level 2 | Set 4 | Set 5 | Set 6 |

It should be appreciated that although Case 1, Case 2 and Case 3 for EPDCCH are taken as an example to illustrate the classification criteria of PDCCH, the existing definition of those three cases should not limit the scope of the present disclosure. For example, the parameters or factors used to specify the cases may be different from those specified in Section 9.1.4 of 3GPP TS 36.213 V13.2.0.

In another additional or alternative implementation, fifth one or more sets of downlink control channel candidates may be designed such that each set of downlink control channel candidates is associated with DCI formats, subframe type, bandwidth, and the number of available REs in addition to URLLC level and coverage modes. More specifically, the fifth one or more sets of downlink control channel candidates are a combination of the first one or more sets of downlink control channel candidates, the second one or more sets of downlink control channel candidates and the third one or more sets of downlink control channel candidates.

Similarly, the association between the sets of downlink control channel candidates and the associated transmission parameters may be explicitly or implicitly signaled to the terminal device or predefined in communication standards or maintained in a way of any combination of them.

Figure 5:
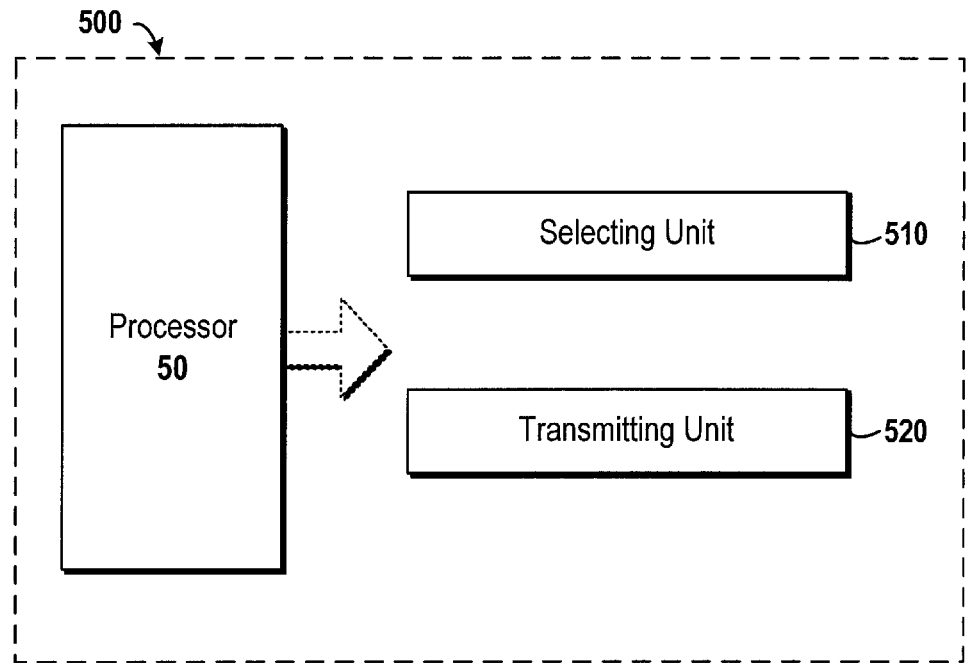
FIG. 5 illustrates a schematic block diagram of an apparatus 500 implemented as/in a network device according to one or more embodiments of the present disclosure.

FIG. 5 illustrates a schematic block diagram of an apparatus 500 implemented as/in a network device according to one or more embodiments of the present disclosure. As shown in FIG. 5, the network device 500, such as eNodeB, is configured to communicate with one or more terminal devices, such as UEs. The network device 500 comprises a selecting unit 510 and a transmitting unit 520. The network device 500 may comprise a suitable radio frequency transceiver for wireless communications with one or more terminal devices via one or more antennas (not shown in FIG. 5). The selecting unit 510 is configured to select, for a terminal device, at least one set of downlink control channel candidates from two or more sets of downlink control channel candidates. Each set of the two or more sets of the downlink control channel candidates is associated with a different communication level. Each set of the two or more sets of the downlink control channel candidates is associated with a different communication level, each communication level corresponding to one or more of a different set of aggregation levels, a different set of transmission formats, a different target block error rate (BLER), and a different target latency. The transmitting unit 520 is configured to transmit, to the terminal device, the selected at least one set of downlink control channel candidates.

In one or more alternative embodiments, the network device 500 may further comprise a signaling sending unit (not shown in FIG. 5) configured to send a signaling to the terminal device to configure a state of the terminal device, where the state of the terminal device is associated with at least one communication level.

According to one or more embodiments of the present disclosure, at least one communication level targets a Quality of Service, QoS, requirement of Ultra-Reliable and Low-Latency Communication (URLLC) communication. In some embodiments, the QoS requirement includes a requirement on the BLER and/or latency.

According to one or more embodiments of the present disclosure, at least one communication level satisfies a Quality of Service, QoS, requirement of BLER lower than a first threshold, and at least another communication level satisfies a QoS requirement of BLER lower than a second threshold.

According to one or more embodiments of the present disclosure, at least one communication level satisfies a Quality of Service, QoS, requirement of URLLC and at least another communication level satisfies a QoS requirement of enhanced mobile broadband (eMBB) communication.

According to one or more embodiments of the present disclosure, one communication level corresponds to a transmission format with a different number of control information bits than the transmission format of another communication level.

According to one or more embodiments of the present disclosure, one of the communication levels corresponds to one or more of (i) an aggregation level as high as or higher than in any other communication level, (ii) a transmission format that includes a number of control information bits that is as low as or lower than in any other communication level, and (iii) a target BLER and/or target latency that is as low as or lower than in any other communication level.

According to one or more embodiments of the present disclosure, repetition for at least one communication level is in at least the frequency domain.

The network device 500 may comprise a processor 50, which includes one or more microprocessor or microcontrollers, as well as other digital hardware, which may include digital signal processors (DSPs), special-purpose digital logic, and the like. The processor 50 may be configured to execute program code stored in memory (not shown in FIG. 5), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 50 may be used to cause the selecting unit 510, the transmitting unit 520, optionally the signaling sending unit (not shown), and any other suitable units of the network device 500 to perform corresponding functions according one or more embodiments of the present disclosure.

Figure 6:
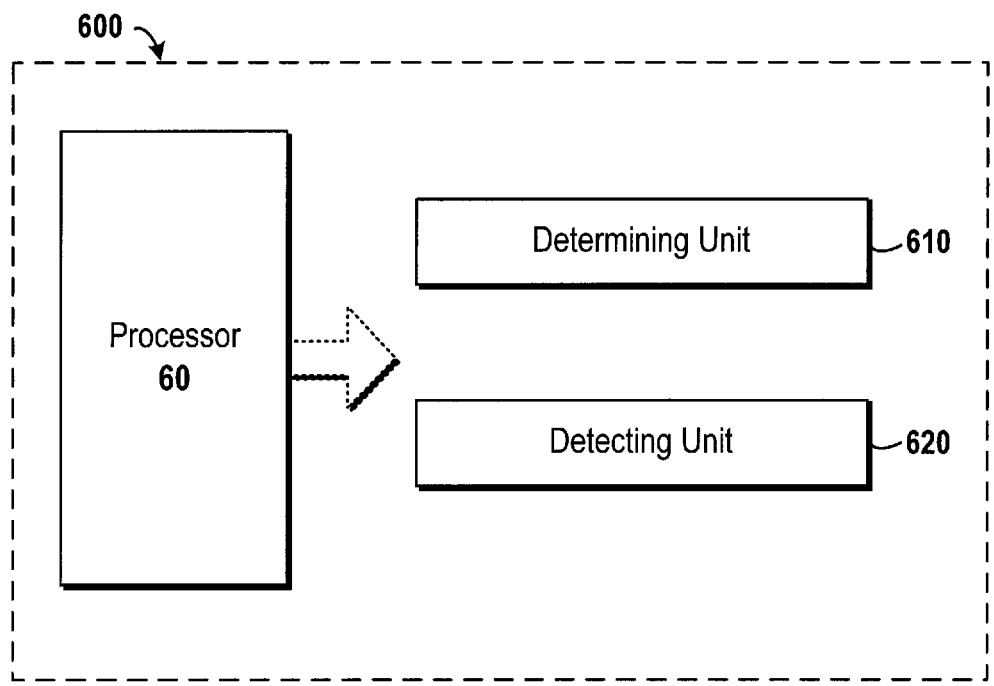
FIG. 6 illustrates a schematic block diagram of an apparatus 600 implemented as/in a terminal device according to one or more embodiment of the present disclosure.

FIG. 6 illustrates a schematic block diagram of an apparatus 600 implemented as/in a terminal device according to one or more embodiment of the present disclosure. As shown in FIG. 6, the terminal device 600, such as UE, is configured to communicate with one or more network devices, such as eNodeB. The terminal device 600 comprises a determining unit 610 and a detecting unit 620. The terminal device 600 may comprise a suitable radio frequency transceiver for wireless communications with one or more network devices via one or more antennas (not shown in FIG. 6). The determining unit 610 is configured to determine at least one set of downlink control channel candidates from two or more sets of downlink control channel candidates. Each set of the two or more sets of the downlink control channel candidates is associated with a different communication level, each communication level corresponding to one or more of a different set of aggregation levels, a different set of transmission formats, a different target block error rate (BLER), and a different target latency. The transmitting unit 620 is configured to detect a downlink control channel in the determined at least one set of downlink control channel candidates.

In one or more alternative embodiments, the terminal device 600 may further comprise a signaling receiving unit (not shown in FIG. 6), configured to receive a signaling to the terminal device to configure a state of the terminal device. The state of the terminal device may be associated with at least one communication level.

According to one or more embodiments of the present disclosure, at least one communication level targets a Quality of Service, QoS, requirement of Ultra-Reliable and Low-Latency Communication (URLLC) communication. In some embodiments, the QoS requirement includes a requirement on the BLER and/or latency.

According to one or more embodiments of the present disclosure, at least one communication level satisfies a Quality of Service, QoS, requirement of BLER lower than a first threshold, and at least another communication level satisfies a QoS requirement of BLER lower than a second threshold.

According to one or more embodiments of the present disclosure, at least one communication level satisfies a Quality of Service, QoS, requirement of URLLC and at least another communication level satisfies a QoS requirement of enhanced mobile broadband (eMBB) communication.

According to one or more embodiments of the present disclosure, one communication level corresponds to a transmission format with a different number of control information bits than the transmission format of another communication level.

According to one or more embodiments of the present disclosure, one of the communication levels corresponds to one or more of (i) an aggregation level as high as or higher than in any other communication level, (ii) a transmission format that includes a number of control information bits that is as low as or lower than in any other communication level, and (iii) a target BLER and/or target latency that is as low as or lower than in any other communication level.

According to one or more embodiments of the present disclosure, repetition for at least one communication level is in at least the frequency domain.

The terminal device 600 may comprise a processor 60, which includes one or more microprocessor or microcontrollers, as well as other digital hardware, which may include digital signal processors (DSPs), special-purpose digital logic, and the like. The processor 60 may be configured to execute program code stored in memory (not shown in FIG. 6), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 60 may be used to cause the determining unit 610, the detecting unit 620, optionally the signaling receiving unit (not shown), and any other suitable units of the terminal device 600 to perform corresponding functions according one or more embodiments of the present disclosure.

Figure 7:
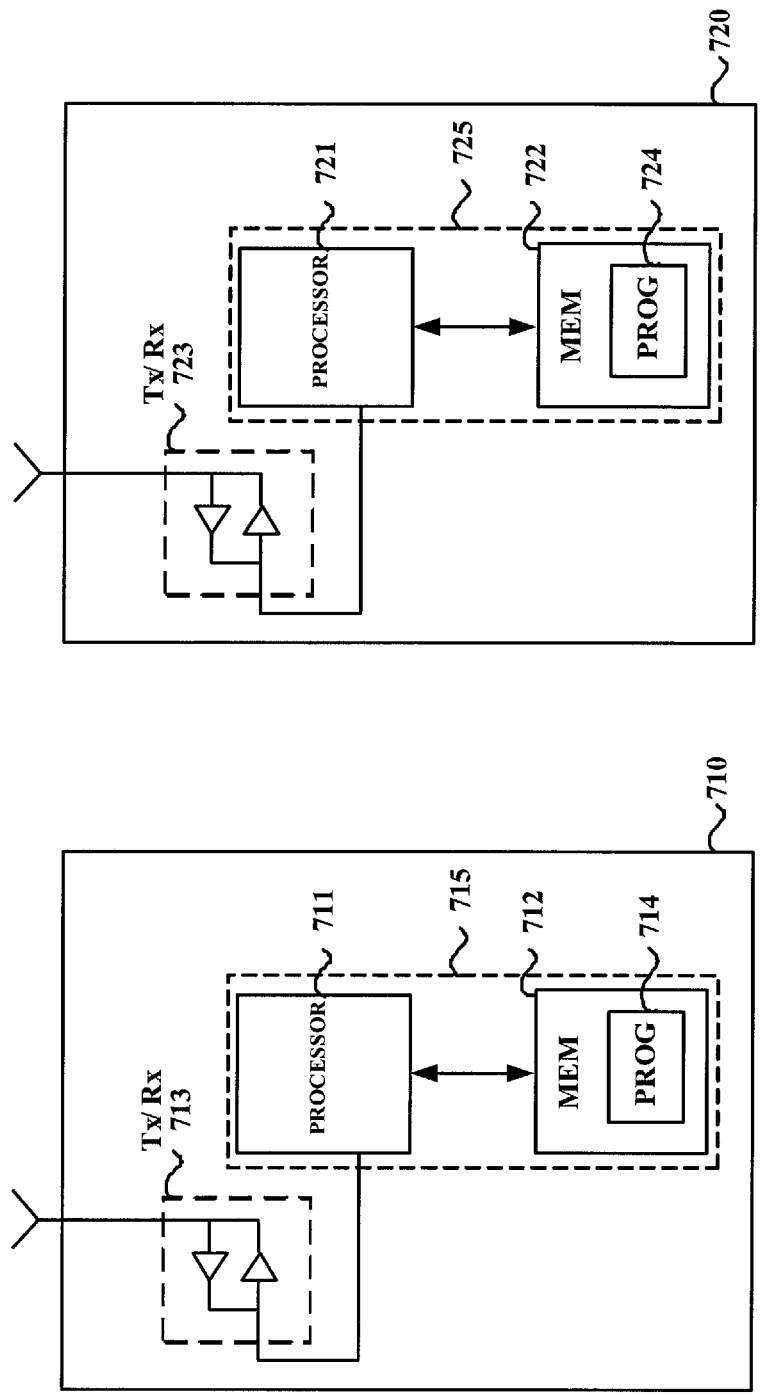
FIG. 7 illustrates a simplified block diagram of an apparatus 710 that may be embodied as/in a network device, and an apparatus 720 that may be embodied as/in a terminal device.

FIG. 7 illustrates a simplified block diagram of an apparatus 710 that may be embodied as/in a network device, e.g., the network device 500, and an apparatus 720 that may be embodied as/in a terminal device, e.g., the terminal device 600.

The apparatus 710 may include one or more processors 711, such as a data processor (DP) and one or more memories (MEM) 712 coupled to the processor 711. The apparatus 710 may further include a transmitter TX and receiver RX 713 coupled to the processor 711. The MEM 712 may be non-transitory machine readable storage medium and it may store a program (PROG) 714. The PROG 714 may include instructions that, when executed on the associated processor 711, enable the apparatus 710 to operate in accordance with the embodiments of the present disclosure, for example to perform the method 200. A combination of the one or more processors 711 and the one or more MEMs 712 may form processing means 715 adapted to implement various embodiments of the present disclosure.

The apparatus 720 includes one or more processors 721, such as a DP, and one or more MEMs 722 coupled to the processor 721. The apparatus 720 may further include a suitable TX/RX 723 coupled to the processor 721. The MEM 722 may be non-transitory machine readable storage medium and it may store a PROG 724. The PROG 724 may include instructions that, when executed on the associated processor 721, enable the apparatus 720 to operate in accordance with the embodiments of the present disclosure, for example to perform the method 300. A combination of the one or more processors 721 and the one or more MEMs 722 may form processing means 725 adapted to implement various embodiments of the present disclosure.

Various embodiments of the present disclosure may be implemented by computer program executable by one or more of the processors 711 and 721, software, firmware, hardware or in a combination thereof.

The MEMs 712 and 722 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 711 and 721 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless system support URLLC scenario, it should not be construed as limiting the spirit and scope of the present disclosure. The principle and concept of the present disclosure may be more generally applicable to other scenarios.

According to embodiments of the present disclosure, different communication levels reflecting service requirements are taken into account when defining downlink control channels. In some embodiments, for URLLC services, the design of downlink control channels may consider URLLC levels, which may focus on QoS requirement in terms of latency and reliability. Therefore, the downlink control channels may reduce the latency and increase the reliability of terminal devices in URLLC. Also, the resource efficiency (e.g., in frequency domain and/time domain) may be improved for the whole system.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a network device, comprising:
    selecting, for a terminal device, at least one set of downlink control channel candidates from sets of downlink control channel candidates, at least two of which mapped to a plurality of communication levels targeting Quality of Service (QoS) requirements of Ultra-Reliable and Low-Latency Communication (URLLC) communication, wherein each set of the at least two sets of the downlink control channel candidates is mapped to a different communication level for URLLC communication, each communication level corresponding to a set of aggregation levels, a set of transmission formats, a target block error rate (BLER), and a target latency, and wherein the sets of downlink control channel candidates further comprise a set of downlink control channel candidates, mapped to one or more communication levels targeting QoS requirements of enhanced Mobile BroadBand (eMBB), and having more control information bits than the sets of downlink control channel candidates mapped to the plurality of communication levels targeting QoS requirements of URLLC communication; and
    transmitting, to the terminal device, the selected at least one set of downlink control channel candidates, wherein the selected at least one set of downlink control channel candidates is mapped to a communication level targeting a QoS requirement of URLLC communication, and wherein the QoS requirement includes a requirement on BLER.

2. The method according to claim 1, wherein at least one communication level satisfies a QoS requirement of BLER lower than a first threshold, and at least another communication level satisfies a QoS requirement of BLER which is lower than a second threshold.

3. The method according to claim 1, wherein one communication level corresponds to a transmission format with a different number of control information bits than the transmission format of another communication level.

4. The method according to claim 3, wherein one of the communication levels corresponds to one or more of (i) an aggregation level no lower than in any other communication level, (ii) a transmission format that includes a number of control information bits that is no higher than in any other communication level, and (iii) a target BLER and/or target latency that is no higher than in any other communication level.

5. The method according to claim 4, wherein repetition for at least one communication level is in at least the frequency domain.

6. A method implemented at a terminal device, comprising:
    determining at least one set of downlink control channel candidates from sets of downlink control channel candidates, at least two of which mapped to a plurality of communication levels targeting Quality of Service (QoS) requirements of Ultra-Reliable and Low-Latency Communication (URLLC) communication, wherein each set of the at least two sets of downlink control channel candidates is mapped to a different communication level for URLLC communication, each communication level corresponding to a set of aggregation levels, a set of transmission formats, a target block error rate (BLER), and a target latency, and wherein the sets of downlink control channel candidates further comprise a set of downlink control channel candidates, mapped to one or more communication levels targeting QoS requirements of enhanced Mobile BroadBand (eMBB), and having more control information bits than the sets of downlink control channel candidates mapped to the plurality of communication levels targeting QoS requirements of URLLC communication; and
    detecting a downlink control channel in the determined at least one set of downlink control channel candidates, wherein the determined at least one set of downlink control channel candidates is mapped to a communication level targeting a QoS requirement of URLLC communication, and wherein the QoS requirement includes a requirement on BLER.

7. The method according to claim 6, wherein at least one communication level satisfies a QoS requirement of BLER lower than a first threshold, and at least another communication level satisfies a QoS requirement of BLER which is lower than a second threshold.

8. The method according to claim 6, wherein one of the communication levels corresponds to one or more of (i) an aggregation level no lower than in any other communication level, (ii) a transmission format that includes a number of control information bits that is no higher than in any other communication level, and (iii) a target BLER and/or target latency that is no higher than in any other communication level.

9. The method according to claim 6, wherein repetition for at least one communication level is in at least the frequency domain.

10. A network device, comprising:
a transmitter, a receiver, a processor, and a memory, the network device configured to:
select, for a terminal device, at least one set of downlink control channel candidates from sets of the downlink control channel candidates, at least two of which mapped to a plurality of communication levels targeting Quality of Service (QoS) requirements of Ultra-Reliable and Low-Latency Communication (URLLC) communication, wherein each set of the at least two sets of the downlink control channel candidates are associated with a different communication level for URLLC communication, each communication level corresponding to a set of aggregation levels, a set of transmission formats, a target block error rate (BLER), and a target latency, and wherein the sets of downlink control channel candidates further comprise a set of downlink control channel candidates, mapped to one or more communication levels targeting QoS requirements of enhanced Mobile BroadBand (eMBB), and having more control information bits than the sets of downlink control channel candidates mapped to the plurality of communication levels targeting QoS requirements of URLLC communication; and
transmit, to the terminal device, the selected at least one set of the downlink control channel candidates, wherein the selected at least one set of downlink control channel candidates is mapped to a communication level targeting a QoS requirement of URLLC communication, and wherein the QoS requirement includes a requirement on BLER.

11. The network device according to claim 10, wherein one communication level corresponds to a transmission format with a different number of control information bits than the transmission format of another communication level.

12. The network device according to claim 10, wherein the set of downlink control channel candidates, mapped to one or more communication levels targeting QoS requirements of eMBB, has a larger hybrid automatic repeat request (HARQ) process number than the sets of downlink control channel candidates mapped to the plurality of communication levels targeting QoS requirements of URLLC communication.

13. The network device according to claim 10, wherein set of downlink control channel candidates, mapped to one or more communication levels targeting QoS requirements of eMBB, does not downlink control channel transmission, while the sets of downlink control channel candidates mapped to the plurality of communication levels targeting QoS requirements of URLLC communication repeats downlink control channel transmission in frequency domain.

14. The network device according to claim 10, wherein the sets of downlink control channel candidates further comprise a set of downlink control channel candidates, mapped to one or more communication levels targeting QoS requirements of massive Machine Type Communication (mMTC), and repeating downlink control channel transmission in time domain, while the sets of downlink control channel candidates mapped to the plurality of communication levels targeting QoS requirements of URLLC communication repeats downlink control channel transmission in frequency domain.

15. A terminal device, comprising:
a transmitter, a receiver, a processor, and a memory, the terminal device configured to:
determine at least one set of downlink control channel candidates from sets of downlink control channel candidates, at least two of which mapped to a plurality of communication levels targeting Quality of Service (QoS) requirements of Ultra-Reliable and Low-Latency Communication (URLLC) communication, wherein each set of the at least two sets of downlink control channel candidates are mapped to a different communication level for URLLC communication, each communication level corresponds to a set of aggregation levels, a set of transmission formats, a target block error rate (BLER), and a target latency, and wherein the sets of downlink control channel candidates further comprise a set of downlink control channel candidates, mapped to one or more communication levels targeting QoS requirements of enhanced Mobile BroadBand (eMBB), and having more control information bits than the sets of downlink control channel candidates mapped to the plurality of communication levels targeting QoS requirements of URLLC communication; and
detect a downlink control channel in the determined at least one set of downlink control channel candidates, wherein the determined at least one set of downlink control channel candidates is mapped to a communication level targeting a QoS requirement of URLLC communication, and wherein the QoS requirement includes a requirement on BLER.

16. The terminal device according to claim 15, wherein at least one communication level satisfies a QoS requirement of BLER lower than a first threshold, and at least another communication level satisfies a QoS requirement of BLER which is lower than a second threshold.

17. The terminal device according to claim 15, wherein one communication level corresponds to a transmission format with a different number of control information bits than the transmission format of another communication level.

18. The terminal device according to claim 15, wherein the set of downlink control channel candidates, mapped to one or more communication levels targeting QoS requirements of eMBB, has a larger hybrid automatic repeat request (HARQ) process number than the sets of downlink control channel candidates mapped to the plurality of communication levels targeting QoS requirements of URLLC communication.

19. The terminal device according to claim 15, wherein the set of downlink control channel candidates, mapped to one or more communication levels targeting QoS requirements of eMBB, does not repeat downlink control channel transmission, while the sets of downlink control channel candidates mapped to the plurality of communication levels targeting QoS requirements of URLLC communication repeats downlink control channel transmission in frequency domain.

20. The terminal device according to claim 15, wherein the sets of downlink control channel candidates further comprise a set of downlink control channel candidates, mapped to one or more communication levels targeting QoS requirements of massive Machine Type Communication (mMTC), and repeating downlink control channel transmission in time domain, while the sets of downlink control channel candidates mapped to the plurality of communication levels targeting QoS requirements of URLLC communication repeats downlink control channel transmission in frequency domain.

\* \* \* \* \*